G. P. THOMAS.
PUNCHING MACHINE.
APPLICATION FILED JUNE 7, 1915.
1,175,198.
Patented Mar. 14, 1916.
10 SHEETS—SHEET 8.
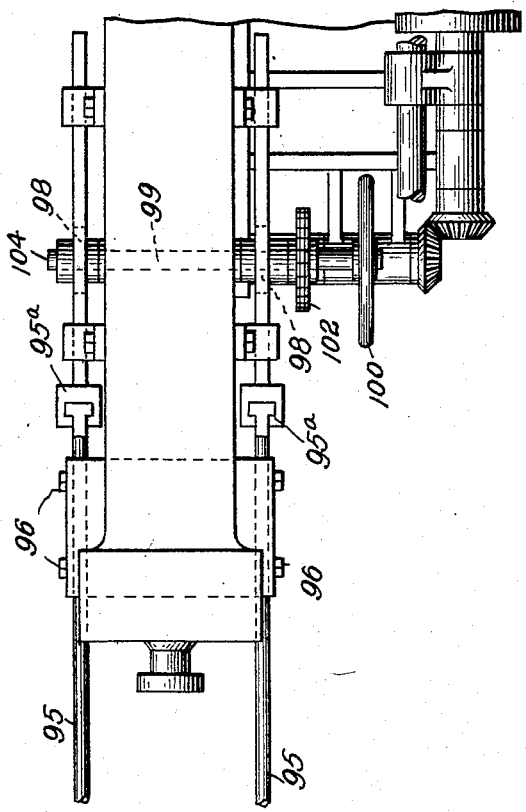
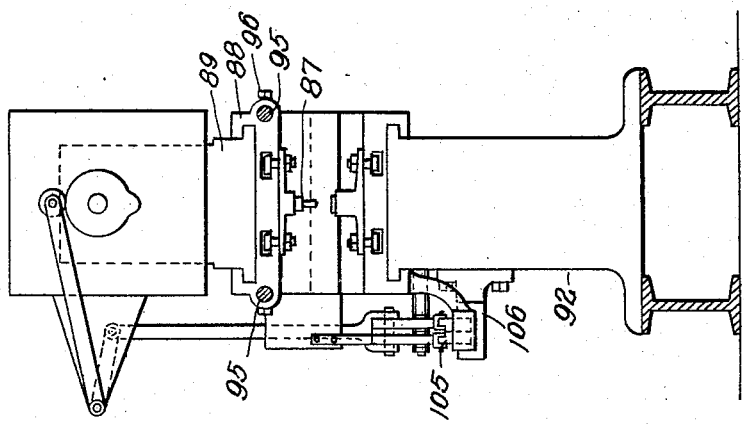
WITNESSES
Paul M. Critchlow
Francis J. Tomasson
INVENTOR
George P. Thomas
by Christy and Christy
his attorneys

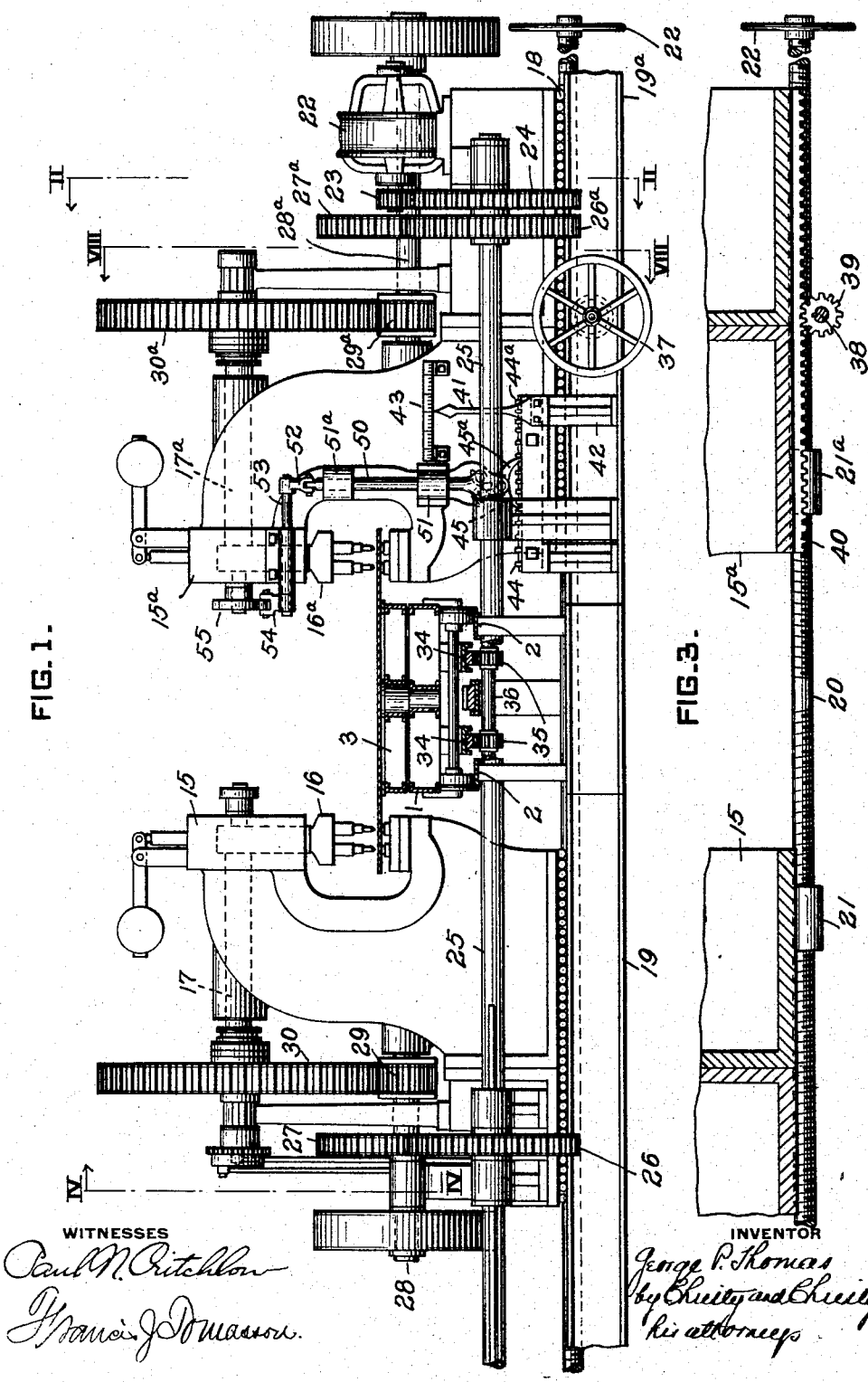

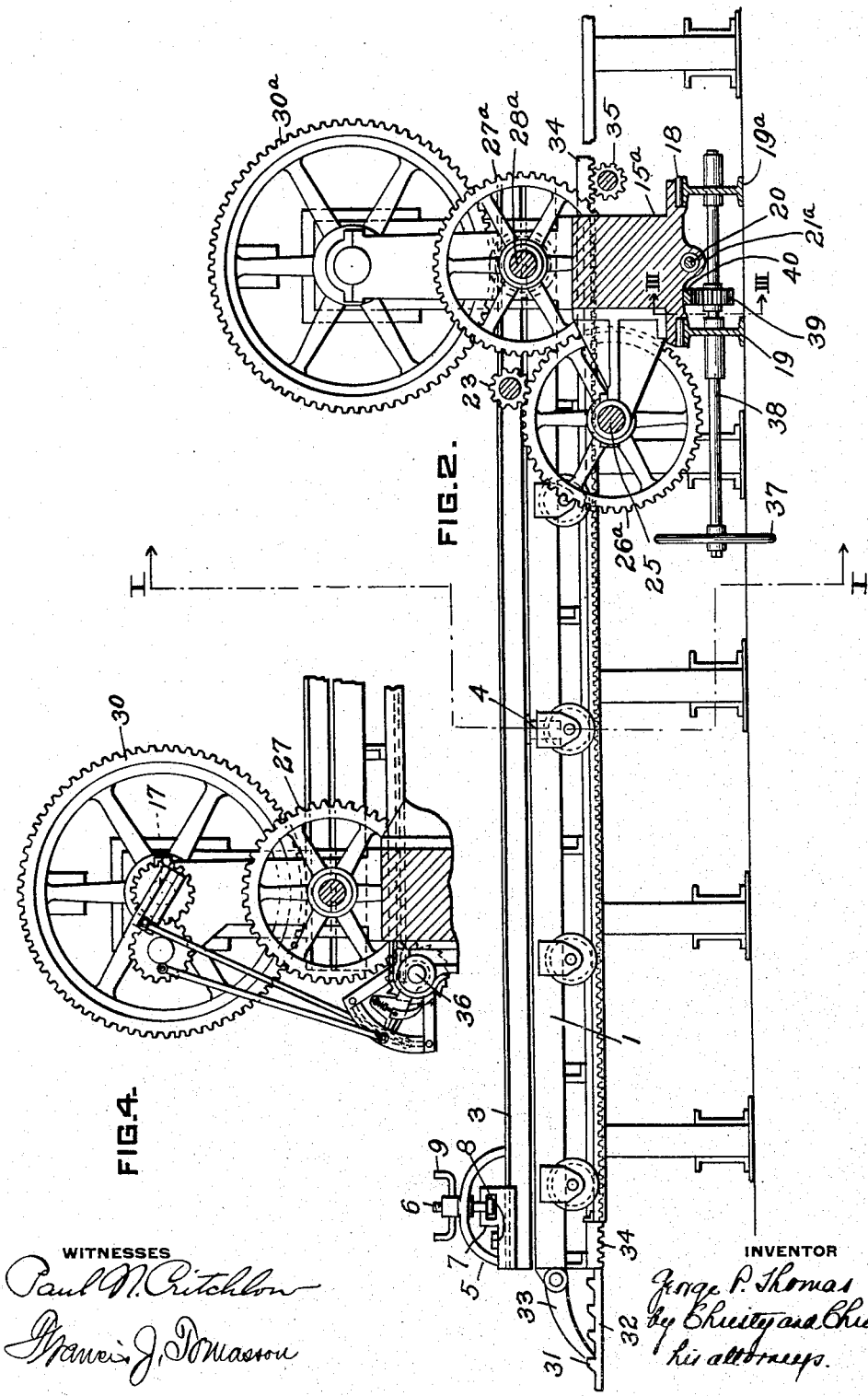

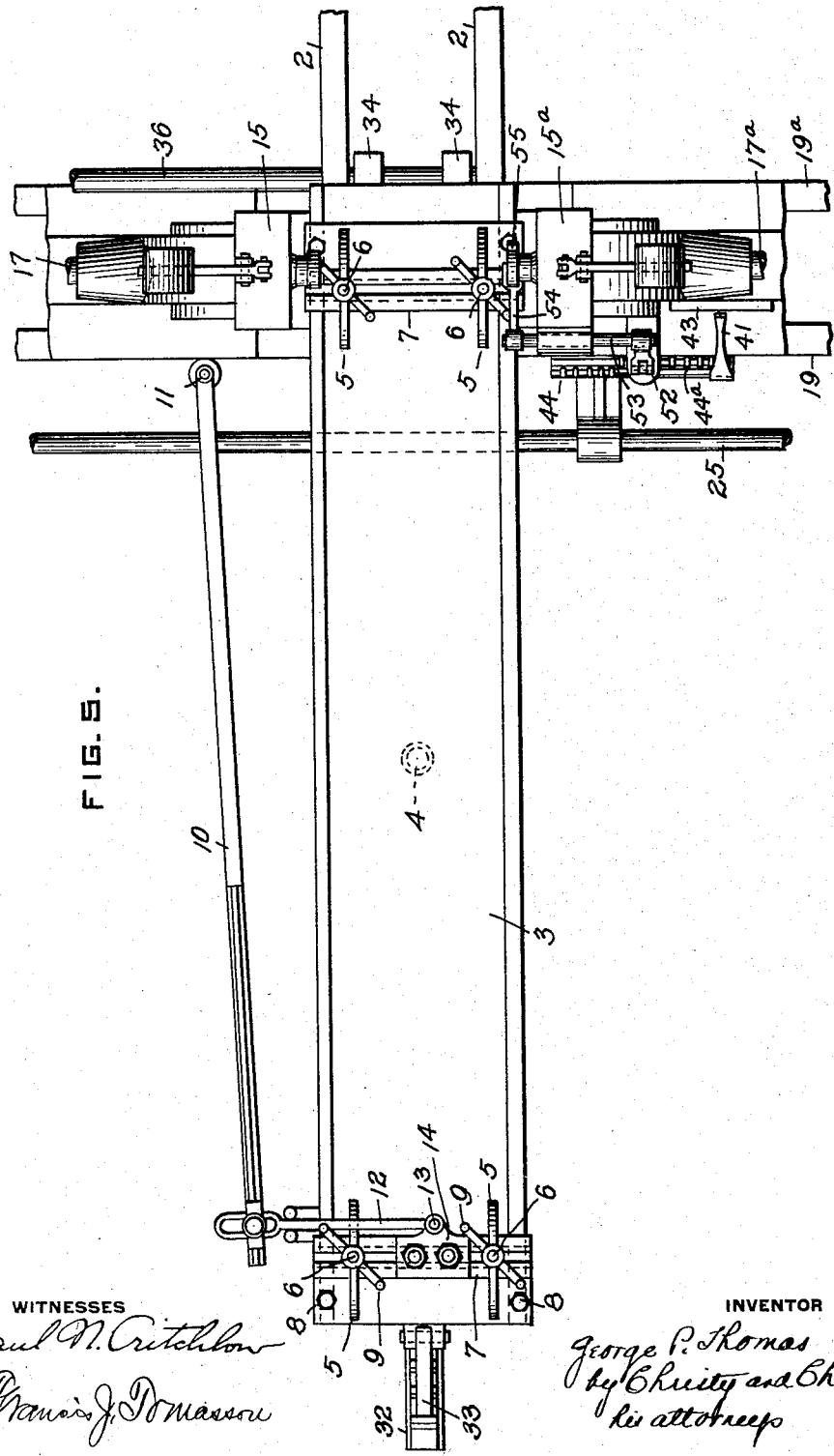

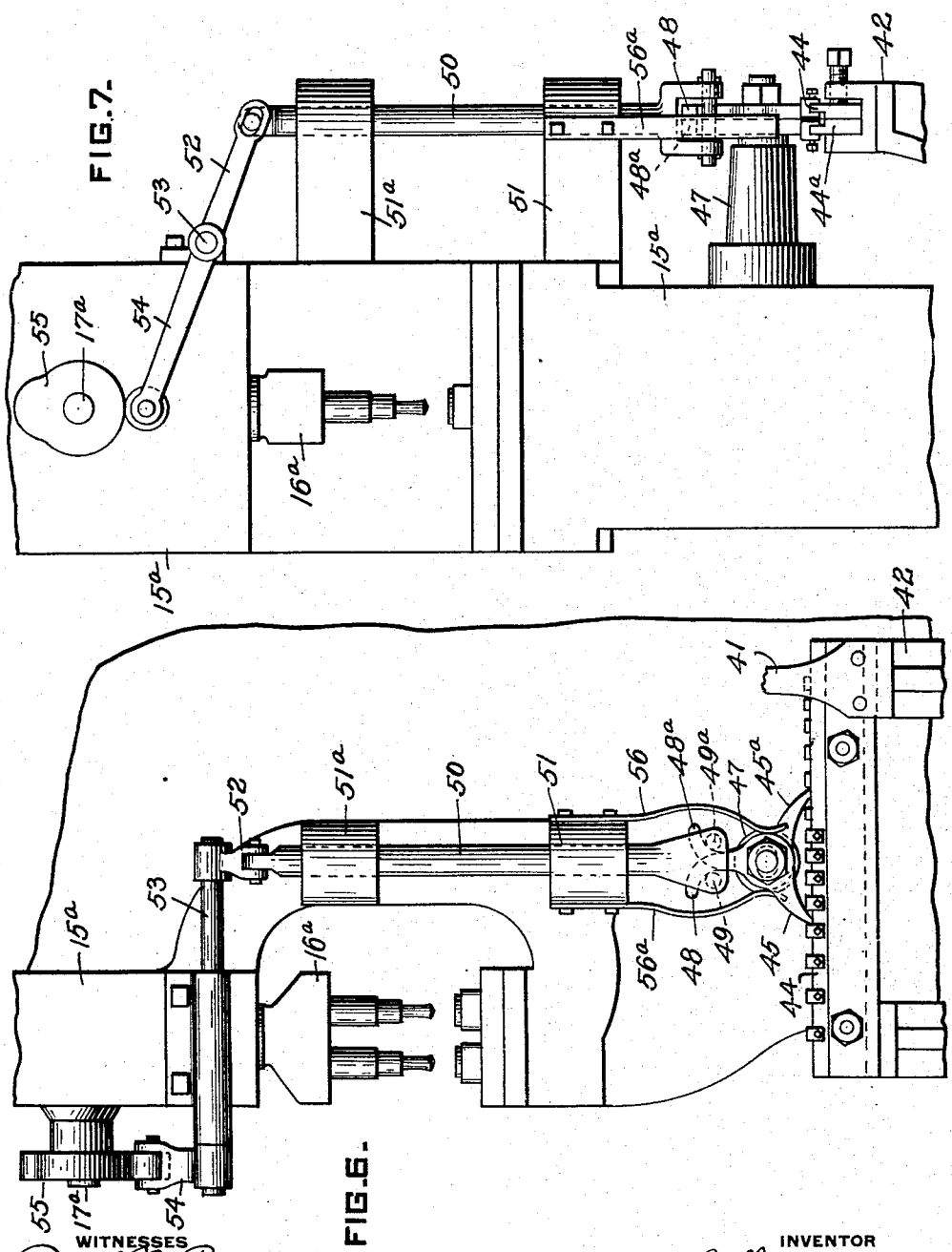

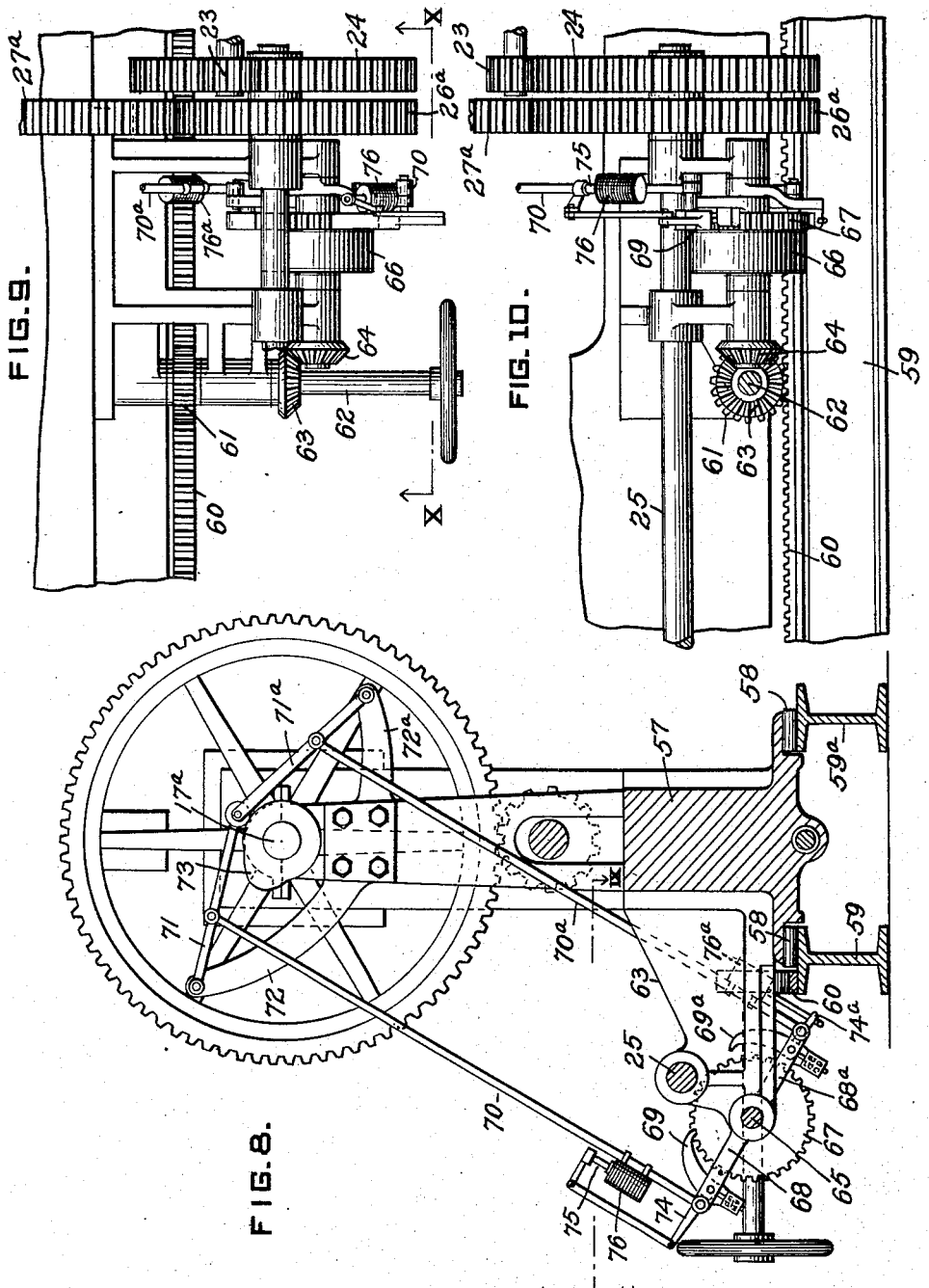

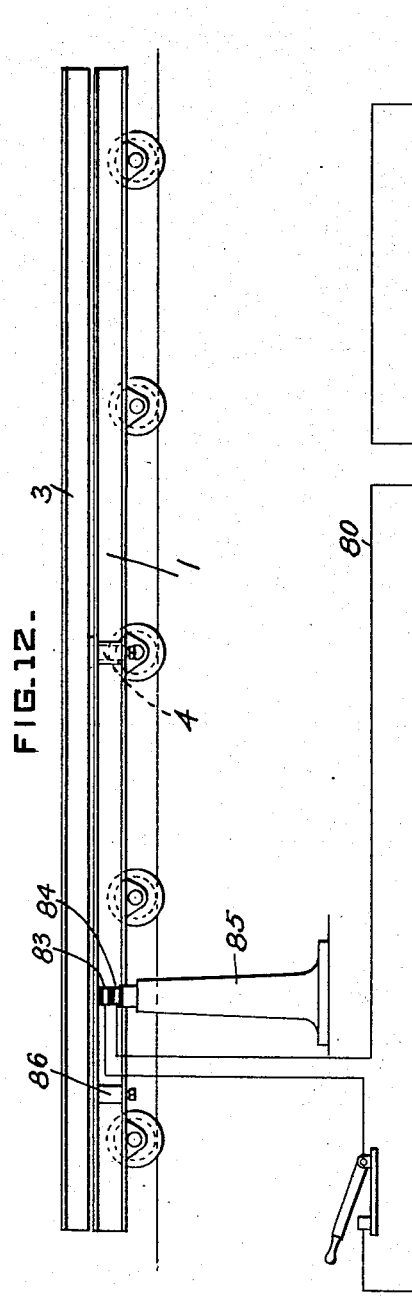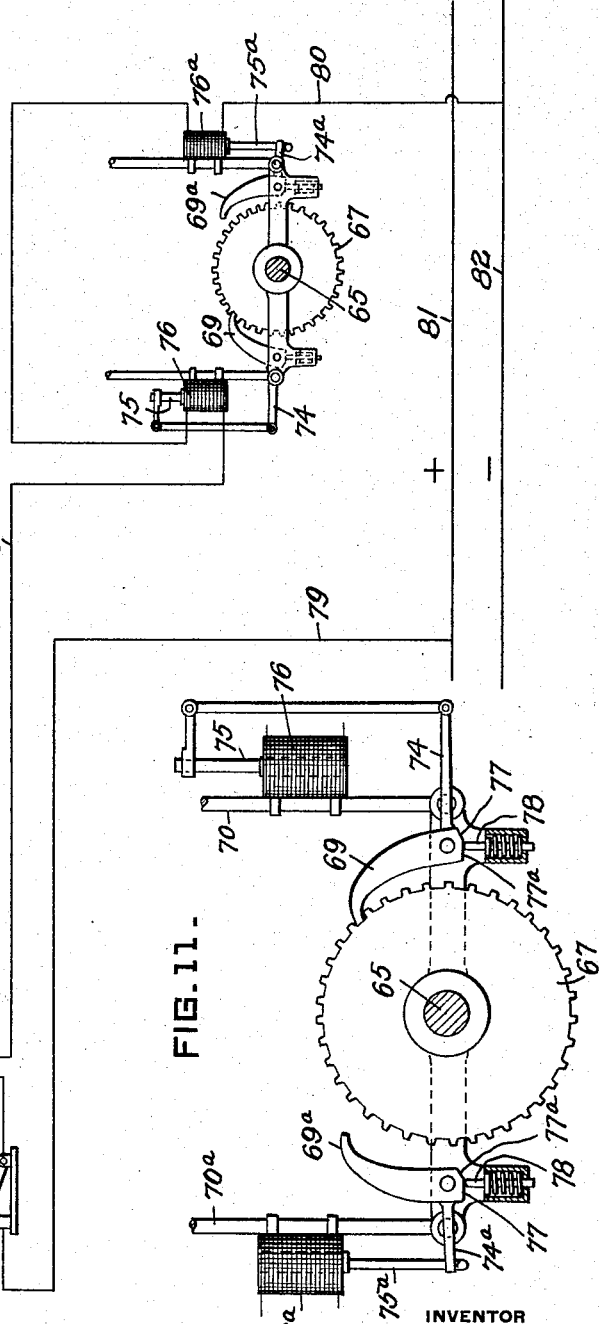

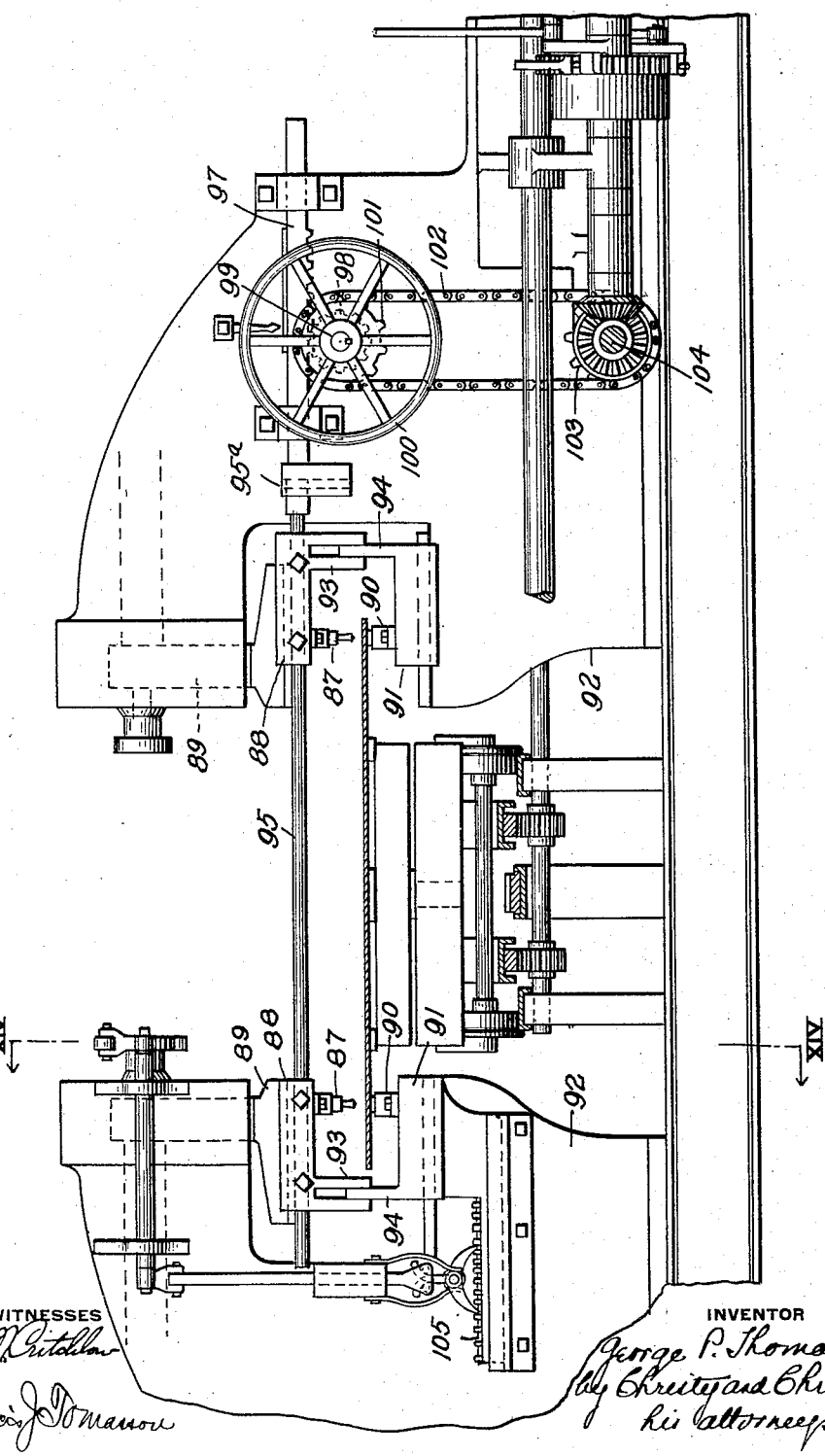

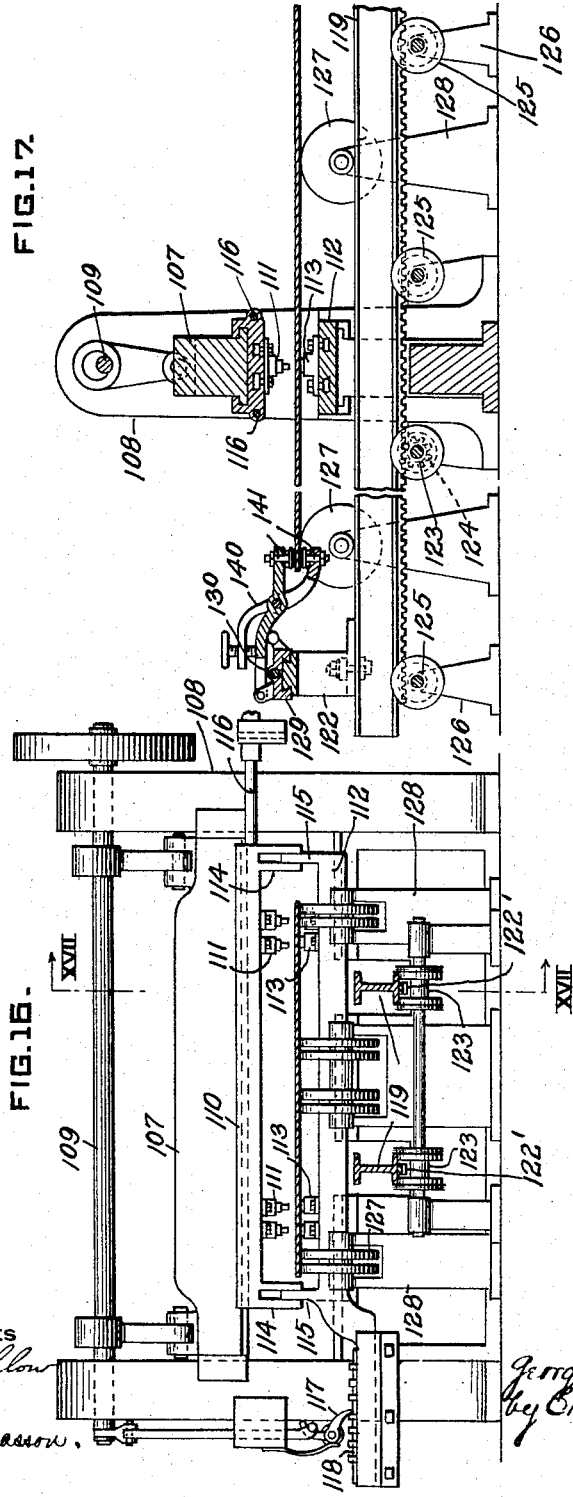

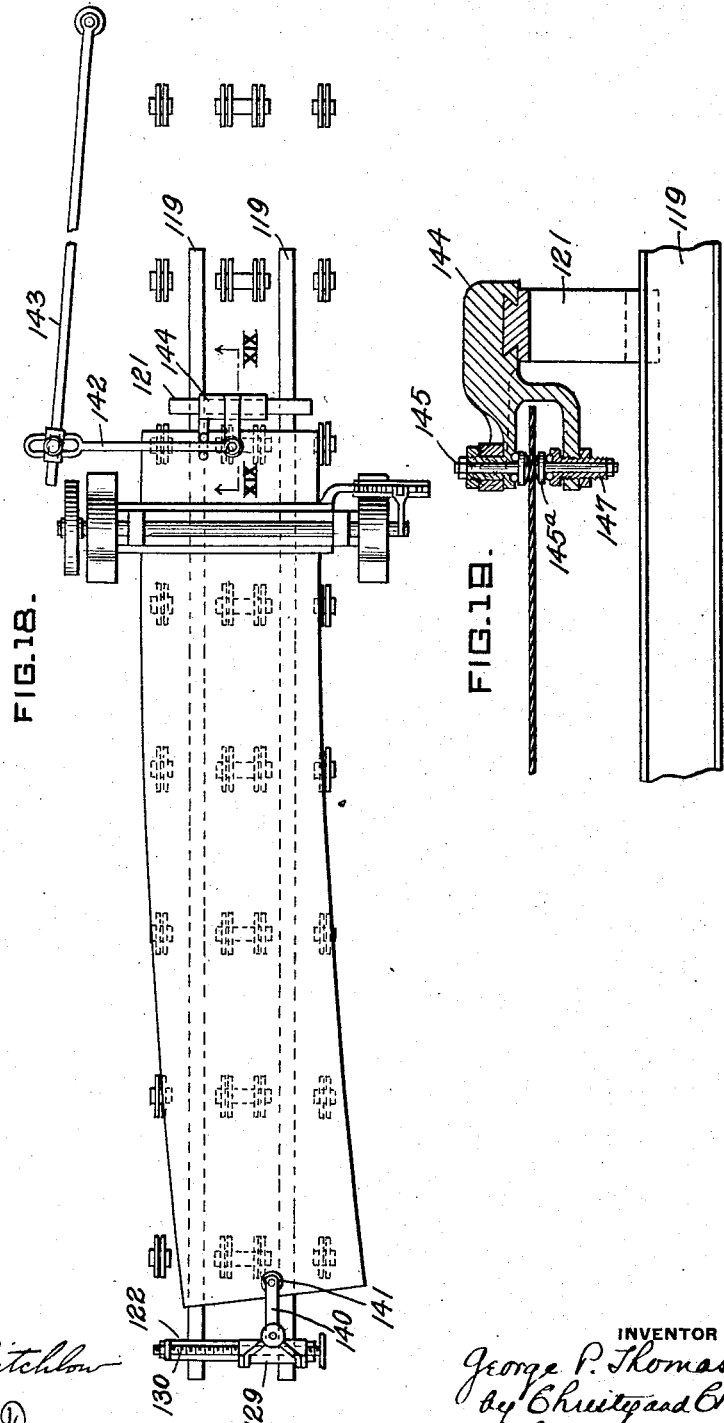

UNITED STATES PATENT OFFICE.

GEORGE PAUL THOMAS, OF GLENSHAW, PENNSYLVANIA.

PUNCHING-MACHINE.

1,175,198.  Specification of Letters Patent.  Patented Mar. 14, 1916.

Application filed June 7, 1915. Serial No. 32,595.

*To all whom it may concern:*

Be it known that I, GEORGE PAUL THOMAS, residing at Glenshaw, in the county of Allegheny and State of Pennsylvania, a citizen of the United States, have invented or discovered certain new and useful Improvements in Punching-Machines, of which improvements the following is a specification.

My invention relates to metal-punching machines, and particularly to such as are used for punching plates for boilers, tanks, stacks, and like structures wherein it is necessary or desirable that the holes lie in the arc of a circle, or in arcs of concentric circles. In another application Serial No. 32,594, filed of even date herewith, I have described and claimed certain improvements in methods of operating machines for this purpose.

The object of my present invention is to provide a machine particularly adapted to carry out such improvements in methods of operation.

In the accompanying sheets of drawings, which form part of my specification I have illustrated several machines embodying my invention.

Figure 1 is a combined sectional view of work-carriage and end view of punch, the plane of view being indicated by the line I—I, Fig. 2; Fig. 2 a view taken on the line II—II, Fig. 1; Fig 3 a sectional view taken on the line III—III, Fig. 2; Fig. 4 a sectional view taken on the line IV—IV, Fig. 1; Fig. 5 a plan view of the work-carriage and the portions of the punches adjacent thereto as illustrated in Figs. 1 and 2; Fig. 6 a view to enlarged scale of a detail of construction shown in Fig. 1; Fig. 7 a left end view of the detail shown in Fig. 6; Fig. 8 a sectional view taken on the line VIII—VIII, Fig. 1, but showing a modification of construction; Fig. 9 a plan view taken on the line IX—IX, Fig. 8; Fig. 10 a sectional elevation taken on the line X—X, Fig. 9; Fig. 11 a sectional view to enlarged scale showing a detail of construction; Fig. 12 a diagrammatic representation of the side of a work-carriage and an electrical circuit for controlling the operation of the mechanism shown in Fig. 11; Fig. 13 a view corresponding to Fig. 1, but showing a machine wherein the tool holders rather than the entire punches are moved laterally; Fig. 14 an elevation taken in the plane indicated by the line XIV—XIV, Fig. 13; Fig. 15 a plan view of the left hand punch of Fig. 13; Fig. 16 a view corresponding to Fig. 1, but to smaller scale, showing a machine wherein the punching is effected by a multiple plate punch, rather than by two punches as shown in Figs. 1 and 13; Fig. 17 a sectional view taken on the broken line XVII—XVII, Fig. 16; Fig. 18 a plan view to reduced scale of the machine of Figs. 16 and 17; and Fig. 19 a sectional view to enlarged scale taken on the line XIX—XIX, Fig. 18.

In the several figures like numerals are used to designate like parts.

The punching machinery which I employ consists essentially of a work-carriage and punch. The carriage is, in some forms of my invention, provided with a pivoted table on which the work is carried, and which, as the carriage is advanced, is rotated by causing a point thereof to follow a straight line guide disposed at an angle to the line of advance of the carriage. The method, disclosed in my above mentioned application, of operating such punching machinery proceeds upon my discovery that, by observing the relations therein indicated, a plate may be punched with holes lying in an arc of a circle or in arcs of concentric circles, provided that as the carriage is advanced there is also effected a relative lateral movement between the carriage and punch. While either or both the carriage and punch may be moved, it is preferred that the latter alone be caused to move transversely with respect to the longitudinal feeding of the work and between each effective punching stroke. Accordingly, in the several illustrative embodiments of my invention means are provided to effect such a lateral shifting of the punch. In one form this is accomplished by mechanism independent of that for reciprocating the punch, and in other forms all the essential movements are coördinated. Furthermore the lateral movement of the punch may be effected either by moving the entire punching machine, or by moving the tool holders.

Before describing in detail the several forms of punches and the means for effecting their lateral movements, I will explain the construction of the work-carriage or spacing table, which, while it may be of any suitable form or construction, may be substantially the same for each of the first two types of punches shown herein. The carriage, illustrated herein, and particularly in Figs. 1, 2 and 5, comprises a truck frame 1, adapted to travel on suitable tracks 2, and a turn-table 3. While the turn-table may be pivoted at any convenient point, and for some purposes presently to be explained may best be pivoted near its end, the pivot point 4 is shown substantially at the center. The opposite ends of the table 3 are provided with adjustable clamping members for holding a plate in fixed position thereon. Such members preferably comprise hold-down bars 5 carried on stud bolts 6, which are mounted for lateral adjustment in transversely extending slotted bars 7, which in turn are adjustable longitudinally of the table and are secured to it by bolts 8. As will be seen, the bars 5 may be clamped firmly upon the top of a plate by turning the hand screws 9.

As already stated, a straight line guide is provided to cause the table 3 to turn as the carriage advances. The guide 10 shown in Fig. 5, has its forward end pivoted to a support 11, and to vary the angle made between the guide and the straight line of advance of the carriage, the former is adjustably connected to the outer end of an arm 12 adapted to engage the table 3. In my above mentioned application, Serial No. 32,594, it is fully explained that the effective point of engagement of the plate to be punched, and hence the table to which such plate is secured, varies with respect to the radius of curvature of an arc passing through the pivot point and concentric with the arc or arcs on which the holes are to be punched. Accordingly, means are provided to adjust the effective point of engagement of the arm 12 with the table 3. For this purpose such arm is pivoted as at 13 to a block 14 secured for lateral adjustment to the rear bar 7; and it will be understood that the point 13 is the effective point of engagement of the plate.

While my invention may be employed in machines for punching but one side of a plate at a time, it is desirable, both for economy in time and accuracy of punching, that both sides be punched simultaneously. The mechanism shown in Figs. 1 and 2 for effecting the punching comprises two punching machines mounted for relative lateral adjustment, but so constructed that they may be operated simultaneously as far as concerns their intermittent lateral movements and the reciprocation of their punching heads. These punches include frames 15 and 15$^a$ provided, respectively, with reciprocatory punching heads 16 and 16$^a$ adapted to be operated by rotatable shafts 17 and 17$^a$. The frames are, through suitable interposed rollers 18, supported by and movable upon beams 19 and 19$^a$. To effect a relative lateral adjustment of the punches so that plates of different widths may be punched, an oppositely threaded screw 20 engages threaded sleeves 21 and 21$^a$ formed on the bottoms of the frames 15 and 15$^a$ between the beams 19 and 19$^a$, such screw being provided with a hand wheel 22 for turning it. Before explaining the mechanism for effecting and controlling the intermittent lateral movements of these punches, I will briefly describe the means for reciprocating the punching heads, and, as coördinated therewith, the means for advancing the work-carriage. Both heads are driven by a single motor 22, supported on the frame 15$^a$, and which, through pinions 23 and 24 drives a shaft 25 extending from one punch frame to the other. The driving of the punch head 16 is effected through pinion 26, feathered to the shaft 25, pinion 27, shaft 28, pinions 29 and 30, and shaft 17. In the same manner the head 16$^a$ is driven by means of corresponding pinions, the only difference being that the pinion 26$^a$ is keyed directly to the shaft 25. Thus it will be seen that the punching heads may be reciprocated simultaneously, and that, because of the feather connection between the pinion 26 and shaft 25, the frames may be adjusted laterally with relation to each other.

The means shown herein for causing the carriage to advance in coördination with the reciprocation of the punching heads are, in all essential respects, the same as are fully shown, described and claimed in my pending application Serial No. 879,275, filed December 28, 1914. They comprise instrumentalities for causing the carriage, between each punching stroke, to move forwardly a distance greater than the largest spacing interval, and, after each of such advances, to move rearwardly into engagement with a stopping element. As shown in Figs. 1 and 2, the stopping element 31 may be formed on the upper face of a bar 32 supported beneath the center of the table, and adapted to be engaged by a pawl 33 secured to the truck frame 1. The frame is also provided with racks 34, adapted to mesh with pinions 35, secured to a shaft 36, which shaft extends to the left side of the punch frame 15. The rotation of the shaft 36 in opposite directions is accomplished in the same manner as is shown in my above mentioned application, Serial No. 879,275, that is to say, by means of pawl- and-ratchet connections extending from the punch-reciprocating shaft 17, as is incompletely shown in Fig. 4.

I will now explain the means for the simultaneous moving of the two punches laterally while the punching heads are being reciprocated and the carriage advanced. This, in the machine of Figs. 1, 2 and 3, is effected by means of a hand wheel 37 secured to a shaft 38, which is rotatably mounted in the beams 19ª, and is provided with a pinion 39 meshing with a rack 40 secured to the bottom of the punch frame 15ª.

It will be understood from my above mentioned application, Serial No. 32,594 that, when the longitudinal extent of the plate to be punched lies on both sides of the pivot point 4 of the turn-table 3, the lateral movement of the punches will be in one direction as the pivot point approaches the punches, and in the opposite direction as such point moves beyond the punches. It follows, therefore, that if the plate, when attached to the table, lies entirely at one side of the pivot point the lateral movement of the punches will be but in one direction. The extent of the successive lateral movements may be determined visually, or stopping elements may be provided to positively arrest each movement. The former may be accomplished by means of a scale 43 borne by the movable punch frame 15ª, and an indicator or pointer 41 attached to a fixed support 42. For positively stopping the punches, the construction shown herein is such as may be used when the plate lies on both sides of the pivot point, and consists of bars 44 and 44ª provided with separately adjustable stops and secured to the support 42, and oppositely-acting pawls 45 and 45ª adapted, respectively, to engage such stops. Each pawl has a slotted opening 46 whereby it is pivoted to an arm 47 secured to and projecting laterally from the frame 15ª, and furthermore the pawls are provided with outwardly curved fingers 48 and 48ª. The lower faces of these fingers are engaged, respectively, by pins 49 and 49ª carried, by a bar 50, slidably mounted in frames 51 and 51ª, and pivotally connected at its upper end to an arm 52 secured to a rock shaft 53. For turning this shaft, it is provided with a second arm 54 adapted to bear on a cam 55 secured to the shaft 17ª. A further detail of this construction consists of springs 56 and 56ª secured to the frame 51 and adapted to bear, respectively, on the sides of the pawls 45 and 45ª.

If it be assumed that the desired lateral movement of the punches is from left to right, as seen in Figs. 1 and 6, the operation of the above described stopping mechanism is as follows: The projection on the cam 55 is in such position that, after each punching stroke of the head 15ª, the bar 50 will be raised, and, through pin 49ª and finger 48ª, cause the pawl 45ª to rotate on the arm 47 and thus be released from the engaged stop of the bar 44ª. The spring 56ª will then be effective to move the pawl to the right the distance permissible by the slotted hole therein, and in such position the pawl will rest upon the top of the stop which it previously engaged. The hand wheel 37 may then be turned, and will be free to be turned, until the punches have been moved to the right sufficiently to cause the pawl to engage the next stop. This operation will be continued until the pivot point 4 of the table 3 arrives at the punching line. As already explained the further movements of the punches are from right to left, and during this time the pawl 45 coöperates with the stops of the bar 44 in the same manner as just described with respect to the pawl 45ª and bar 44ª. The gradual diminishing and increasing of the spacing of the stops on the bars 44ª and 44, respectively, as well as the relative positions of such bars will be fully understood from my above mentioned application Serial No. 32,594.

The machine which I have just described may be operated entirely automatically, that is to say, mechanical rather than manually operable means may be provided for effecting the lateral movements of the punches, and such means may be so coördinated with the reciprocation of the punching heads and the advance of the carriage that, when the machine is set up, it will punch an entire plate without further adjustment or control on the part of a workman. Instrumentalities to such end are shown in Figs. 8 to 12 inclusive, it being understood that such figures merely show modifications of the machine just described, and that all the parts not shown in these figures may be the same as illustrated in Figs. 1 to 7, inclusive. Referring first to Figs. 8, 9 and 10 the punch frame 57 is, through roller bearings 58 supported on beams 59 and 59ª. The upper flange of the beam 59 is provided with a rack 60 adapted to be engaged by a pinion 61 secured to a shaft 62, which shaft is rotatably mounted in a supplementary frame 63 secured to and projecting laterally from the frame 57. The intermittent rotation of the shaft 62 for effecting the lateral movements of the punches is coördinated with the reciprocation of the punches, and to such end is actuated by the rotatable shaft 17ª. While various constructions may be employed for this purpose, I preferably use a pawl-and-ratchet mechanism, interposing a yielding clutch in the line of connections. The shaft 62 is provided with a pinion 63 which meshes with a second pinion 64 secured to the casing member of a friction clutch 66. This clutch may be constructed the same as shown and described in my application Serial No. 879,276 and hence need not be explained in detail herein. The other member of such clutch is, through a shaft 65, attached to a ratchet 67, having teeth that may be effectively engaged on either side. Rotatably mounted on the shaft 65 there are oppositely projecting arms 68 and 68a, provided, respectively, with pawls 69 and 69a, and attached at their outer ends to pitmen 70 and 70a. These pitmen are in turn connected to levers 71 and 71a, which are pivoted at their outer ends to arms 72 and 72a, and are provided at their inner ends with rollers adapted to bear upon a cam 73 secured to the shaft 17a. It will be understood of this construction that one pawl and its operatively connected parts is provided to turn the ratchet in one direction and the other pawl for turning it in the opposite direction, depending of course on which way the punches are to be shifted. To the end that one pawl may be rendered active and the other inactive at the required time for effecting a reversal of the movements of the punches, electro-magnets are operatively connected to the pawls, such magnets being placed in a circuit adapted to be closed when the pivot point 4 of the turn-table 3 arrives at the punching line. This construction is shown particularly in Figs. 11 and 12, wherein the pawls 69 and 69a are provided with laterally extending fingers 74 and 74a, operatively connected to the armature 75 and 75a of the magnetic coils 76 and 76a, which coils in turn are attached to the pitmen 70 and 70a, respectively. As will be seen in Fig. 11, the pawls are provided with angularly disposed faces 77 and 77a against which spring-pressed fingers 78 may bear to hold the pawls into or out of engagement with the ratchet 67. In Fig. 12 the ratchet, pawls and their controlling solenoids are shown to smaller scale than in Fig. 11, and in connection with an electric circuit. The conductors 79 and 80 for the solenoid circuit are taken from line wires 81 and 82, and terminate in separately-insulated contactors 83 and 84 attached to a suitable support 85 at the side of the carriage 1, the conductor 80 passing in series through the magnetic coils 76 and 76a. To the side of the carriage 1 there is attached a conducting bar or bridge 86, adapted, when the carriage is advanced, to close the circuit between the two contactors 83 and 84, and hence complete the circuit through the magnets 76 and 76a. The position on the carriage of the bridge 86 is such that it will reach the contactors 83 and 84 at substantially the same time that the pivot point 4 arrives at the punching line.

Before starting the punching machine, the pawls 69 and 69a will be set in the position indicated in the drawings, the pawl 69 being in engagement with the ratchet 67, and effective, through the pitman 70, to turn it. The amount of turning of the ratchet upon each reciprocation of the pitmen is sufficient to cause the punches to be moved laterally a distance greater than the maximum required lateral movement, the excess turning being effective, through the slipping of the friction clutch 66, to hold the stopping pawl 45a firmly against a stop of the bar 44a. When the bridge 86 contacts with the contactors 83 and 84, a circuit will be closed through the magnets 76 and 76a. This will cause the armature 75 to move downwardly, as viewed in Fig. 11, and hence the pawl to be thrown from engagement with the ratchet, and likewise the armature 75a will be moved upwardly and the pawl 69a into engagement with the ratchet. The reciprocation of the pitman 70a will then cause the punches to move laterally in the opposite direction. It will be observed of this construction that the reciprocation of the punching heads, the intermittent advances of the carriage, and the lateral movements of the punches are all so coördinated that the complete punching of a plate may be automatically effected.

In the machine of Figs. 13, 14 and 15 the punch frames are stationary, and instrumentalities are provided for moving the tool-holders laterally. The construction of the carriage, the means for effecting its intermittent advance, and the means for effecting the reciprocation of the punching heads may be the same as that shown in the machine of Figs. 1 and 5, inclusive, and need not be again described. As to the construction shown for effecting a lateral movement of the punching tools independently of the punch frames, the punches 87 are adjustably secured to blocks 88, which are slidably mounted on the ends of the reciprocatory punching heads 89. In a similar manner the dies 90 are secured to blocks 91 slidably mounted on the punch frame 92. The oppositely disposed blocks 88 and 89 are interconnected for simultaneous lateral movement by means of sleeves or boots 93 and rods 94, respectively, forming parts of such blocks. For effecting the desired lateral movements of the punches and dies, rods 95 are, by means of set screws 96, secured to each side of the blocks 88, and at their outer ends are, through vertically sliding joints 95a, connected with rack bars 97, which mesh with pinions 98 secured to a shaft 99. This shaft may be turned by a hand wheel 100 in the same manner as shown in the machine of Figs. 1 and 5 inclusive, or it may be turned mechanically and in coördination with the advance of the carriage and the reciprocation of the punching heads. The latter may be effected through a sprocket wheel 101 secured to the shaft 99, chain 102, and sprocket wheel 103 secured to a shaft 104, which shaft may be driven in the same manner as already described with respect to the mechanism illustrated in Figs. 8, 9, and 10. Furthermore, the stopping of the lateral movements of the blocks 88 and 91 may be accomplished by mechanism illustrated in detail in Figs. 6 and 7, it being understood that in the machine of Fig. 13 the stop-provided bars 105 are carried by one of the slidable blocks 91, the punch frame being provided with a suitable guide 106 to afford the desired rigidity of the parts.

The machine of Figs. 16 and 19, inclusive, differs in several essential respects from the machines already described. In the first place it includes but a single reciprocatory punching head arranged above, and extending substantially the full width of, the plate to be punched, and a coöperating die-supporting anvil beneath the plate; secondly, the greater portion of the weight of the plate to be punched is sustained by stationary rollers, rather than by a movable carriage; thirdly, the effective pivot point of the plate is at one end of the plate, and the point of engagement for turning the plate on such pivot point is at the other end thereof; and finally, because the plate is pivoted at one end rather than at the center or other intermediate point, the lateral movements of the punching tool are in but one direction. Referring to the embodiment of the invention illustrated in these figures, the punching head 107 is reciprocated in the frame 108 by means of a power shaft 109, which may be driven in the same manner as the shaft 17$^a$ of the machine of Fig. 1. Similarly to the machine of Fig. 13, the head 107 is provided with a longitudinally slidable block 110 to which the punch holders 111 are adjustably attached. Also, the die-anvil comprises a longitudinally slidable block 112, to which the die holders 113 are adjustably attached. The blocks 110 and 112 are provided, respectively, with boots 114 and rods 115 so that both may be moved in unison, and such movement may be effected in the same manner as the blocks 88 and 91 of the machine of Fig. 13, suitable rods 116 being attached to the blocks 110. The stopping mechanism for the lateral movements of the punching tools may also be the same as that already described with respect to Fig. 13, with the exception that in the present machine there is but a single pawl 117 and a single stop-provided bar 118.

The work-carriage preferably consists of a pair of beams 119 and end frames 122 and 121, the lower flanges of the beams being provided with rack bars 122′ adapted to be engaged by pinions 123 secured to a shaft 124, which shaft may be driven in the same manner as the driving shaft 36 of the machine of Figs. 1 and 5, inclusive. The carriage beams 119 are supported by a plurality of roller-provided shafts 125 rotatably mounted on suitably spaced supports 126, and the weight of the plate moved by the carriage is sustained by rollers 127 borne by standards 128 placed at the sides of the beams 119. As already stated of the present machine, the plate is pivoted at one end, rather than at an intermediate point. To such end the frame 122 is provided with a laterally slidable block 129, which may, by means of a screw 130 be adjusted to any desired or required position. This block is provided with a pair of tongs 140 which hold the plate rigid as far as lateral or horizontal movement is concerned, but which permit of such vertical movement of the plate as it is well known is necessary in punching operations. The ends of the tongs are provided with rotatable plate-engaging pins 141, which form the pivot point of the plate, and which permit the plate to turn freely in a manner presently to be explained.

As shown in the work-carriage illustrated particularly in Fig. 5, the plate moved by the present work-carriage is turned by means of an arm 142 which engages a guide 143. The arm 142 is pivotally connected to a block 144, which is laterally slidable upon the frame 121, and which is provided with rotatable clamping pins 145 and 145$^a$, the latter of which is mounted in a screw-threaded vertically adjustable collar 147 as clearly seen in Fig. 19. It will be observed, from a consideration of the showing of Fig. 18, that, as the block 144 moves laterally, the distance between the clamping pins 141 and 145 will necessarily be slightly shortened and cause a buckling in the plate unless means are provided to permit a longitudinal movement of the pins 145. This, in the present embodiment of my invention, is effected by permitting the frame 121 to slide longitudinally of the beams 119.

In briefly explaining the operations of the three general forms of machines which I have described, they will, as far as possible, be designated as the machines of Figs. 1, 13 and 16, such figures being the most complete showings of the several machines. In the first place it is necessary to determine, in order to properly construct or arrange the stopping elements 31 of the bar 32 (Fig. 4), the required intervals of longitudinal advance of the work-carriage, and also the corresponding relative lateral movements of punches and carriage must be determined in order to arrange the stops of the bars 44 and 44$^a$ (Figs. 6 and 7). This may be done either by the procedure explained in my heretofore mentioned application Serial No. 32,594, or in some other convenient manner.

Furthermore, in determining these longitudinal and lateral intervals, it is necessary at the same time to determine the pivot point of the plate, its effective point of engagement for turning, and the inclination of the guide to the line of advance of the carriage. With such data at hand the plate may be placed in its proper position on the work-carriage. If the carriage is such as is illustrated in Fig. 5, the above mentioned previously-determined pivot point of the plate is placed in vertical alinement with the pivot 4 of the table 3, and the block 14 is so adjusted laterally that the pivot point 13 of the arm 12 is in vertical alinement with the previously-determined effective point of engagement of the plate. On the other hand, if the carriage is such as is illustrated in Fig. 18, the pivot point of the plate will be the point of engagement of the pins 141, and the effective point of engagement of the plate for turning it will be the point at which the pins 145 engage the plate. In either case the lateral adjustment of the arms 12 (Fig. 5) and 142 (Fig. 18), and the positions of their controlling guides 10 and 143, will be such that a line between the required positions of the end holes through the opposite sides of the plate will coincide with the punching line when the carriage has advanced the plate to the punches. When the machine is put into operation, as by starting the motor 22 (Fig. 1) the punches will be reciprocated, and, through the pawl and ratchet connections (Fig. 4), the carriage will be intermittently advanced, it being understood that, as the carriage advances, the plate will be turned on its pivot point.

The required relative lateral movements of punches and carriage may, in the machine of Fig. 1, be effected by moving the entire punching machine laterally. This may be done manually by the hand wheel 37, or mechanically, and in coördination with the reciprocation of the punches and the advance of the carriage, by the mechanism shown in Figs. 8, 9 and 10, which, as already explained, illustrate a modification of the machine of Fig. 1. In the machines of Figs. 13 and 16 the punching frames remain stationary and the punching tools, which are mounted on slidable blocks, are moved laterally by means of the mechanism shown in Figs. 13, 14 and 15. In all the forms of machine the lateral movements of the punches may be stopped and controlled by means of the mechanism particularly illustrated in Figs. 6 and 7.

I claim as my invention:

1. In a tool operating machine, the combination of a work-carriage, means for pivotally connecting a piece of work thereto, a guide for causing work to rotate on its pivot point as the carriage advances, laterally adjustable connections between such guide and the work, a tool operating member, and means for effecting a relative lateral movement between said carriage and member as the carriage feeds work to the latter.

2. In a tool operating machine, the combination of a work-carriage, means for pivotally supporting work thereon, a guide for causing work to rotate on its pivot point as the carriage advances, laterally adjustable connections between such guide and the work, means effective as the carriage advances for maintaining such connections in a substantially constant angular relation to the line of advance of the carriage, a tool operating member, and means for effecting a relative lateral movement between said carriage and member as the carriage feeds work to the latter.

3. In a metal-punching machine, the combination of a work-carriage, means for pivotally supporting work thereon, a guide at the side of the carriage for causing the work to rotate on its pivot point as the carriage advances, laterally adjustable connections between such guide and the work and including an arm pivoted at the effective point of engagement of the plate and engaged by such guide, means effective as the carriage advances for maintaining such arm in a substantially constant angular relation to the line of advance of the carriage, a reciprocatory punching member, and means for effecting a relative lateral movement between said carriage and member as the carriage feeds work to the latter.

4. In a metal-punching machine, the combination of a work-carriage, means for pivotally connecting a piece of work thereto, a guide for causing work to rotate on its pivot point as the carriage advances, laterally adjustable connections between such guide and the work, a reciprocatory punching member, and means for effecting a relative lateral movement between said carriage and member as the carriage feeds work to the latter.

5. In a metal-punching machine, the combination of a work-carriage, means for pivotally supporting work thereon, a guide for causing work to rotate on its pivot point as the carriage advances, laterally adjustable connections between such guide and the work, means effective when the carriage advances for maintaining such connections in a substantially constant angular relation to the line of advance of the carriage, a reciprocatory punching member, and means for effecting a relative lateral movement between said carriage and member as the carriage feeds work to the latter.

6. In a metal-punching machine, the combination of a work-carriage, means for pivotally supporting work thereon, a guide for causing work to rotate on its pivot point as the carriage advances, laterally adjustable connections between such guide and the work, means effective when the carriage advances for maintaining such connections in a substantially constant angular relation to the line of advance of the carriage, a plurality of reciprocatory punching tools arranged in a line transverse to the line of advance of the carriage, and means for effecting a relative lateral movement between said carriage and punching tools as the carriage feeds work to the latter.

7. In a metal-punching machine, the combination of a work-carriage, means for pivotally connnecting work thereto, a guide for causing the work to rotate on its pivot point as the carriage advances, a reciprocatory punching member, and means for moving said member laterally as the carriage feeds work thereto.

8. In a metal-punching machine, the combination of a work-carriage, means for pivotally supporting work thereon, a guide for causing the work to rotate on its pivot point as the carriage advances, laterally adjustable connections between such guide and the work, a plurality of punching tools arranged in a line transverse to the line of advance of the carriage, and means for moving said tools laterally as the carriage feeds work thereto.

9. In a tool-operating machine, the combination of a work-carriage, means for pivotally connecting a piece of work to such carriage, a guide for causing work to rotate on its pivot point as the carriage advances, a tool-operating member, means for effecting a relative lateral movement between said carriage and member as the carriage feeds work to the latter, and stopping elements for controlling such lateral movements.

10. In a metal-punching machine, the combination of a work-carriage, means for pivotally supporting a piece of work thereon, a guide for causing work to rotate on its pivot point as the carriage advances, a reciprocatory punching member, means for intermittently moving such member laterally as the carriage feeds work thereto, and stopping elements for controlling such lateral movements.

11. In a metal-punching machine, the combination of a work-carriage, means for pivotally connecting a piece of work thereto, a guide for causing the work to rotate as the carriage advances, means for advancing the carriage longitudinally, a punching member, means for reciprocating said member, and means coördinated with the reciprocation of such member for moving it laterally.

12. In a metal-punching machine, the combination of a work-carriage, means for pivotally connecting a piece of work thereto, a guide for causing the work to rotate as the carriage advances, a punching member, means for reciprocating said member, means for intermittently moving said member laterally, and means for intermittently advancing said carriage, said last three mentioned means being coördinated for a continuous punching operation.

13. In a metal-punching machine, the combination of a work-carriage, means for pivotally connecting a piece of work thereto, a guide for causing the work to rotate as the carriage advances, a punching member, means for reciprocating said member, means coördinated with the reciprocation of the punching member for intermittently moving it laterally, and means coördinated with the reciprocation of the punching member for intermittently advancing the work-carriage.

14. In a metal-punching machine, the combination of a work-carriage, means for pivotally connecting a piece of work thereto, a guide for causing the work to rotate as the carriage advances, a reciprocatory punching head, laterally movable punches borne by such heads, means for reciprocating said head, and means effective during the reciprocation of the head for intermittently moving said punches laterally.

15. In a metal-punching machine, the combination of a work-carriage, means for pivotally connecting a piece of work thereto, a guide for causing the work to rotate as the carriage advances, a reciprocatory punching head, a laterally-movable punch-sustaining member borne by said head and having punches adjustably secured to it, a laterally movable die-sustaining member having dies adjustably secured to it, and operative connections coördinated with the reciprocations of the punching head for effecting intermittent and simultaneous lateral movements of said punch and die sustaining members.

16. In a metal-punching machine, the combination of a work-carriage, means for pivotally connecting a piece of work at one of its ends to said carriage, guiding connections for engaging the work at its opposite end and effective to cause the work to rotate as the carriage advances, a single reciprocatory punching head provided with laterally movable punches adapted to operate on the opposite edges of a piece of work, means for reciprocating said head, and means effective during the reciprocation of the head for intermittently moving said punches laterally.

17. In a metal-punching machine, the combination of a work-carriage, laterally adjustable connections for pivotally securing a piece of work at one of its ends to said carriage, laterally movable guiding connections for engaging the work at its opposite end and effective to cause the work to rotate as the carriage advances, a single reciprocatory punching head provided with laterally movable punches adapted to operate on the opposite edges of a piece of work, means for reciprocating said head, and means effective during the reciprocation of the head for intermittently moving said punches laterally.

In testimony whereof I have hereunto set my hand.

GEORGE PAUL THOMAS.

Witnesses:
PAUL N. CRITCHLOW,
FRANCIS J. TOMASSON.

Copies of this patent may be obtained for five cents each, by addressing the "Commissioner of Patents, Washington, D. C."